FIG. I

INVENTORS A. E. BACHELET
J. S. BOMBA
BY
*J. W. Schmied*
ATTORNEY

INVENTORS A. E. BACHELET
J. S. BOMBA
BY
J. W. Schmied
ATTORNEY

INVENTORS A. E. BACHELET
J. S. BOMBA

United States Patent Office 2,746,028
Patented May 15, 1956

2,746,028

AIR RAID WARNING SYSTEM

Albert E. Bachelet, New York, and James S. Bomba, Manhasset, N. Y., assignors to Bell Telephone Laboratories, Incorporated, New York, N. Y., a corporation of New York Application August 5, 1952, Serial No. 302,645

7 Claims. (Cl. 340—147)

The invention relates to a signalling system and more particularly to a signalling system suitable for use in an aircraft warning network.

An object of the invention is to provide a multistation signalling system that gives a continuous indication of the operative condition of all stations in the system.

Another object of the invention is to provide a signalling system that will provide a continuous check on the transmission paths between all stations in the system.

Another object of the invention is to provide a signalling system that provides a means for furnishing a plurality of distinctive warning signals to all stations in the network.

Another object of the invention is to provide a signalling system that will provide an alarm indication if any stations in the system should fail to acknowledge receipt of any warning signal sent out from the control station.

A feature of the invention is the utilization of the natural delay characteristics of a telephone line to provide a means of identifying each of the various stations in the system.

Another feature of the invention is the utilization of a multiconductive position cold cathode gas stepping tube to check return signals from all stations and actuate an alarm if each station is not operating properly.

In an air raid warning system, it is necessary to provide a means for furnishing a plurality of distinctive alarms or signal indications to all of the receiving stations in the network as conditions may require. In the air raid system used today, the distinctive signals are known as red, yellow and white conditions of alert. Condition red represents the time in which an immediate enemy air attack is expected. Condition white usually represents the all-clear signal. Condition yellow may represent a condition wherein an attack is expected but is not imminent. Each receiving station, upon the receipt of a distinctive signal, as described above, will initiate action according to a prearranged plan.

It is highly desirable in an air raid system to provide some means whereby the operator at the control center can ascertain whether or not each and all of the receiving stations have received the distinctive alarm signal sent out and have complied with the receipt of said distinctive signal by taking the proper prearranged action. If an operator at the control center is able to ascertain that a certain station has not received and complied with the transmitted signal, he may take whatever action may be necessary to warn any receiving station that has apparently not received or complied with the transmitted signal. For example, if the transmission path to a certain receiving station should become open for any reason whatsoever, the control center operator may take whatever additional steps may be necessary to warn the community dependent upon the defective receiving station for the propagation of air raid alarms.

The system disclosed herein, which consists of a main control center and a plurality of remote receiving stations, meets all the above prerequisites for a desirable air craft warning system. The entire system is operated and controlled by two pairs of two wire telephone lines. The operator at the control center has means provided wherein he can transmit a plurality of distinctive alarm signals to all of the receiving stations. Means are also provided wherein the operator can ascertain whether or not each receiving station has received and complied with the transmitted alarm signal. The control center operator also has means provided whereby he can check the correct functioning of the transmission paths and of the receiving station apparatus during periods in which alarm signals are not transmitted. An audible alarm at the control center will be actuated in the event that any receiving station should fail to operate properly.

In the drawing:

Fig. 1 is a diagrammatic representation used to illustrate the basic principles of the invention and shows a control center connected to a plurality of receiving stations by means of two pairs of two wire telephone lines. While only two such receiving stations are shown in Fig. 1, it is to be realized that as many such receiving stations as desired for the purpose may be utilized.

Figure 1:
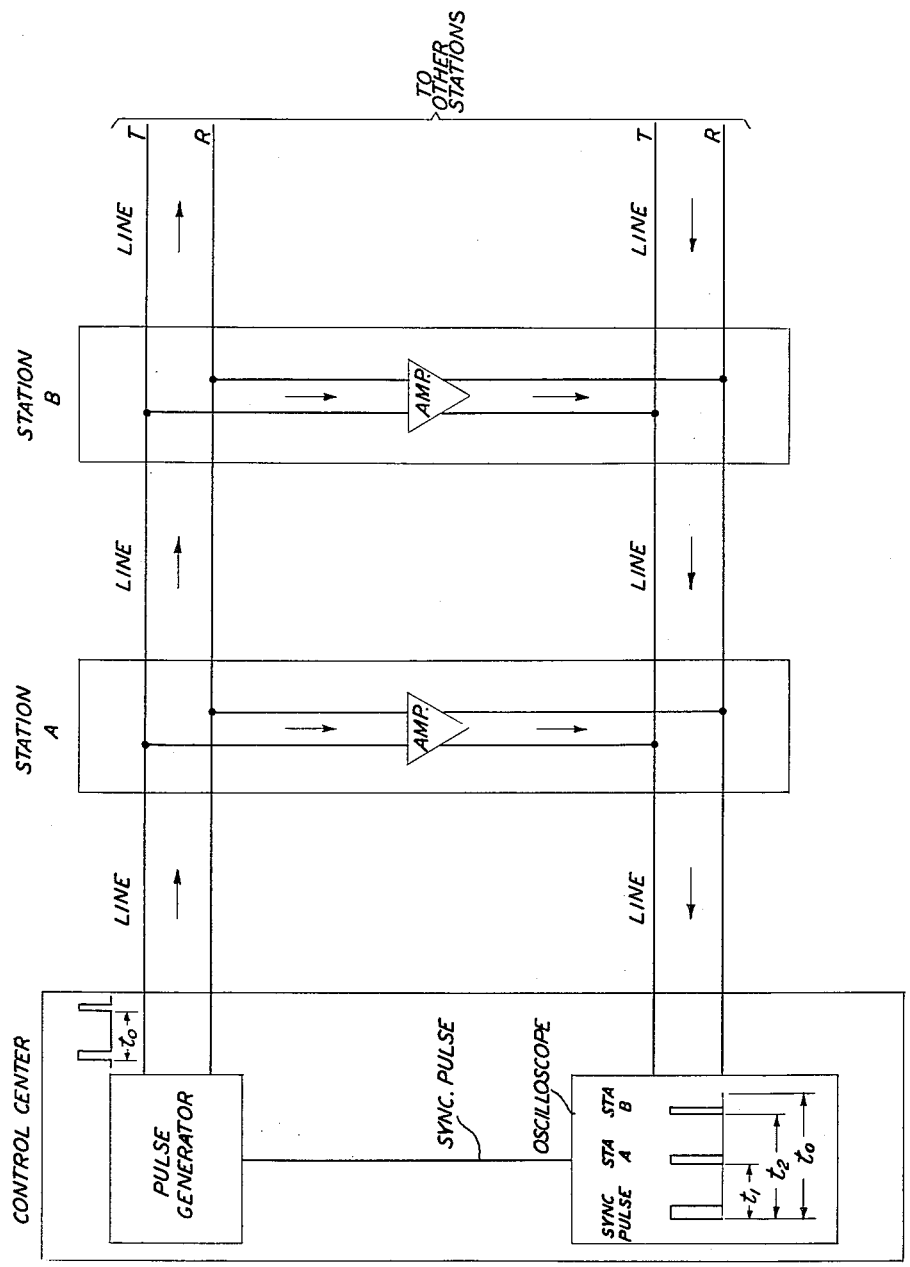
Fig. 1 is a diagrammatic representation that illustrates the general principles of the invention.

The pulse generator at the control center applies cyclically reoccurring pulses to the telephone line shown at the top in Fig. 1. These pulses travel along the line to the right until they reach station A. As each pulse reaches station A, it is amplified in station A and applied to the lower line, over which it travels back to the oscilloscope and other related apparatus in the control center. The time required for one pulse to travel from the pulse generator through the amplifier in station A, and back over the telephone line to the control center may be designated time $t_1$. This time will be determined by the delay characteristics of both telephone lines.

Each pulse originating in the pulse generator will also travel along the upper telephone line, as shown in Fig. 1, to the right until it reaches station B. The amplifier in Station B will amplify each pulse and apply it to the telephone line returning to the control center. The time required for each pulse to travel from the pulse generator to station B, and then back to the control center may be designated $t_2$. Time $t_2$ will be controlled by the inherent delay characteristics of both the telephone lines. Since station B is further from the control center than is station A, the time for the pulse sent from the pulse generator to make the round trip to station B and back will, of necessity, be somewhat larger than the time required for the same pulse to make the round trip from the control center to station A and back. Therefore, $t_2$ will, of necessity, be greater than $t_1$. If other receiving stations are associated with the control center, the time for a pulse to return from any additional receiving station will be governed by the distance that station may be from the control center.

The frequency of the train of pulses emanating from the pulse generator is low enough so that all the pulses returning from the receiving stations will have time to return to the control center before another pulse is applied to the telephone line by the pulse generator.

Means is provided in the control center whereby each pulse transmitted from the pulse generator will synchronize and control the sweep circuit of an oscilloscope at the control center. Means is also provided at the control center whereby the reflections of each pulse returning from the receiving stations will impress signals on the vertical deflection circuit of the oscilloscope at the control center. This circuit arrangement will cause the oscilloscope to present a picture similar to that shown in Fig. 1 whereby each reflection of a transmitted pulse is shown on the face of the oscilloscope and is displaced horizontally a distance to the right as determined by the time required for each pulse to make the round trip from the control center to its related receiving stations and back to the control center. The return pulse from station A will be displayed the furtherest to the left on the scope screen; the return pulse from station B will be shown some distance to the right; and any additional receiving station a further distance from the control center than is station B will have its return pulse shown on the oscilloscope screen some distance to the right of the return pulse of station B.

The operator, by viewing the oscilloscope, may ascertain the correct functioning of the entire system as would be evidenced by the presentation on the oscilloscope screen of all reflections of each pulse from its associated receiving station. Should the equipment in any receiving station be malfunctioning, or should the telephone line to that station be broken, the reflected pulse from the inoperable station will be missing from the picture on the oscilloscope. An audible alarm at the control center will be actuated in the event that any receiving station should operate improperly. The operator at the control center upon hearing the audible alarm or upon observing the lack of pulses from any receiving station on the oscilloscope screen, may take whatever additional action may be necessary.

Figure 2:
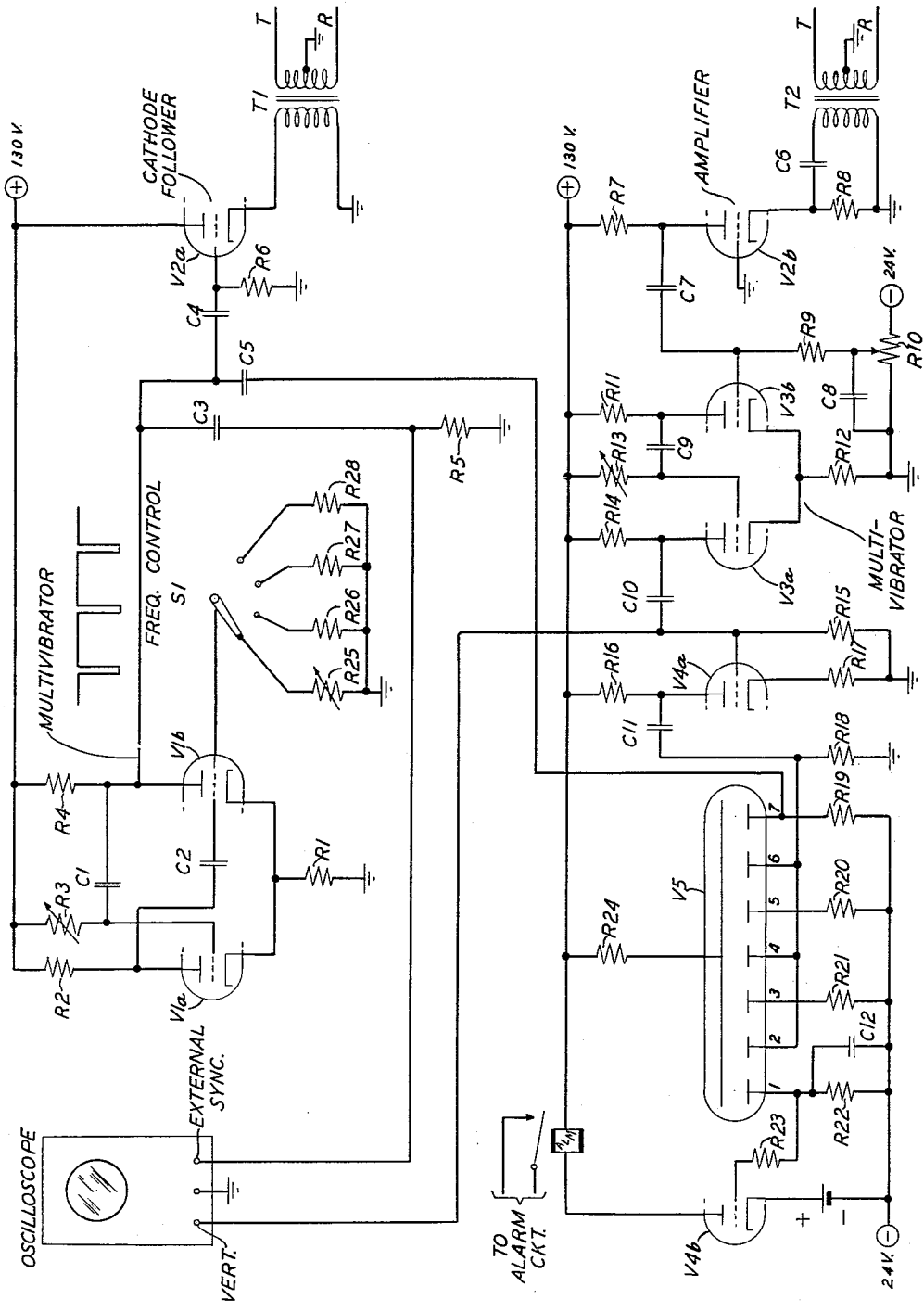
Figs. 2 and 3, when placed side by side, illustrate a preferred exemplary embodiment of a circuit utilizing the principles of the invention.

Fig. 2 illustrates an exemplary circuit that would be utilized at the control center. Tubes V1a and V1b together with resistors R1, R2, R3 and R4 and condensers C1 and C2 comprise an unsymmetrical, free-running multivibrator. The degree of unbalance between the two halves of the multivibrator is such that tube V1a conducts over 100 times as long as tube V1b conducts in any one cycle. Resistor R3 and resistors R25 through R28 are used to control the frequency of the multivibrator. The wave form of the plate voltage of tube V1b is shown in Fig. 2. This causes a series of cyclically reoccurring negative pulses to be applied to condensers C3, C4 and C5.

Each pulse from the plate of tube V1b will be applied through condenser C5 to the cathode 7 of tube V5. Tube V5 is a multiconductive position gaseous discharge tube and may, but need not, be of the same general type of tube as shown in the patent to M. A. Townsend, Patent No. 2,575,372, patented November 20, 1951. The operation of this tube is such that discharge initially takes place between the main anode and cathode 7. The discharge is initiated by the application of a negative pulse to cathode. The discharge can be made to step to other positions in the tube by the application of negative pulses to the lead connecting cathodes 2, 4 and 6. The first negative pulse applied to this lead will cause cathode 6 to assume a high negative potential, which in turn will cause the discharge to step from position 7 to position 6 because the potential differential between the main anode and cathode 6 will be greater than the potential differential between the main anode and cathode 7. Upon the termination of the negative pulse to cathode 6, cathode 6 will rise in value and thereby transfer the discharge to position 5 where it will remain until another negative pulse is applied to the lead connecting cathodes 2, 4 and 6. The next negative pulse applied to this lead will cause the discharge to step from position 5 to position 3. The next negative pulse will cause the discharge to transfer from position 3 to position 1. The negative pulse applied through condenser C5 to cathode 7 is of great enough potential that it will cause the discharge to reset to position 7. Therefore, each pulse generated by tube V1b will reset tube V5 to position 7.

The reflections of each pulse returning from the various receiving stations will, by means hereinafter described, cause tube V5 to step to different positions as determined by the number of pulses returning. Then, as the next pulse is generated by tube V1b, the tube V5 will again return to its normal position 7.

The number of cathodes in tube V5 will be dependent on the number of stations in the system. Tube V5 in Fig. 2 is designed to work in a system having three receiving stations. It should be remembered that this showing is merely exemplary and that as many receiving stations as desired could be associated with each system.

The negative pulses applied to condenser C3 control the sweep circuit in the oscilloscope. This is done by means of the lead connecting R5 and C3 with the external sync terminal on the oscilloscope. This circuit causes the horizontal sweep circuit of the oscilloscope to assume the frequency of the pulses developed by the multivibrator.

The negative pulses are applied through condenser C4 to the grid of tube V2a which operates as a cathode follower. The pulses applied to the grid of tube V2a will be applied to the outgoing telephone line by transformer T1 which is located in the cathode circuit of tube V2a. Each pulse applied to the outgoing telephone line by transformer T1 will travel along the line and energize an amplifier in each receiving station.

Figure 3:
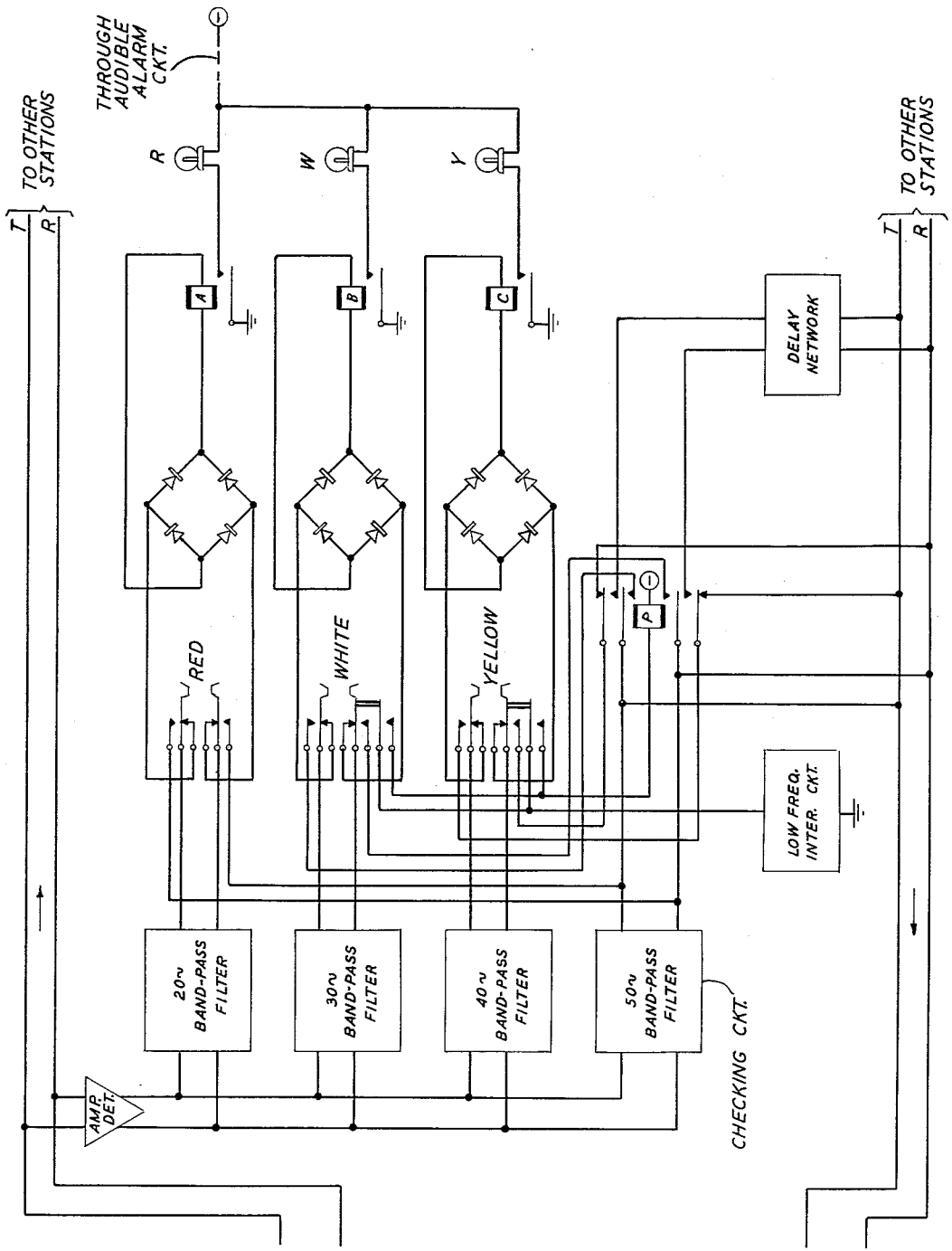

Fig. 3 illustrates the equipment that would be located at each receiving station. Each pulse applied by transformer T1 to the outgoing telephone and then amplified by the amplifier in each receiving station will be applied to the input of the various band pass filters as shown in Fig. 3. Assuming, for example, that the pulse frequency is 50 cycles, the pulses will pass only through the 50 cycle band pass filter and will be applied to the lower telephone line shown in Fig. 3, over which they will return to the control center.

The pulses returning to the control station will be applied to the grounded grid amplifier V2b by means of transformer T2, condenser C6 and resistor R8. The amplified pulses appearing on the plate of V2b will be transmitted through condenser C7 to the grid of tube V3b. Tubes V3a and V3b, together with their associated circuit elements comprise a one-shot multivibrator. Resistors R10 and R13 control the input sensitivity and the output wave form respectively, of the multivibrator. Resistor R10 allows the multivibrator to be operated so that it will respond to the desired returning pulses but will not respond to any extraneous noise signals on the line. The normal operation of the multivibrator is such that V3a normally conducts while V3b is normally cut off. Each positive pulse applied to the grid of V3b momentarily turns V3a off and V3b on. V3b will remain on for a period of time as determined by C9 and R13, after which V3a and V3b will revert to their normal condition.

Each cycle of operation of the one-shot multivibrator will cause a positive pulse to appear on the plate of tube V3a as it goes from a conducting to a non-conducting condition. This positive output pulse is applied through condenser C10 to the vertical deflection circuit of the oscilloscope wherein it will cause the reflected pulse from each station to assume a distinctive position on the oscilloscope. As stated before, the operator at the control center may view the oscilloscope picture in order to ascertain whether or not all the proper reflected pulses are displaced on its face. Should any reflected pulse be missing, the operator can instantly note this defect and take whatever action he may desire.

The positive pulses appearing on the plate of tube V3a are also applied through condensor C10 to the grid of amplifier tube V4a. This amplifies and inverts the pulses so that they will appear as negative pulses on the plate of V4a. These negative pulses are applied through condenser C11 to the lead interconnecting resistor R18 and cathodes 2, 4 and 6 of the multiconductive position gaseous stepping tube V5.

As explained before, the normal operation of tube V5 is such that it normally sustains a discharge between its anode and cathode 7. As the reflected pulse from the first distant receiving station is received, a negative pulse will be applied to resistor R18, and cathodes 2, 4 and 6 will be driven negative which, in turn, will cause the discharge in the tube to step from cathode 7 to cathode 6 for the duration of the negative pulse. As the negative pulse terminates, cathode 6 will raise in potential and cause the discharge in the tube to step to cathode 5. The return pulse from the next distant receiving station, arriving at a somewhat later time, will cause another operation of the one-shot multivibrator which, in turn, will by means of tube V4a cause another negative pulse to be applied to cathodes 2, 4 and 6. This second negative pulse will cause the discharge to step from cathode 5 to cathode 4 for the duration of the pulse, after which, it will transfer to cathode 3. The return pulse from the next distant receiving station will cause another negative pulse to be applied to tube V5 which will cause the discharge to step from cathode 3, to cathode 2 and then to cathode 1. As cathode 1 conducts, the voltage drop across the resistor R22 will charge condenser C12, which in turn will cause a positive potential to be applied to the grid of tube V4b. The value of resistor R22 is chosen so that cathode 1 will be at a positive potential during the time it conducts.

The stepping action in tube V5 will be repeated once for each pulse applied to the outgoing telephone line by transformer T1. In the specific example assumed, the reflected pulse from station A would cause the tube V5 to step from position 7 to position 5, the return pulse from station B would cause the tube to step from position 5 to position 3, while the return pulse from station C, not shown on Fig. 1, will cause tube V5 to step from position 3 to position 1. Should there be any additional receiving stations, it would be necessary to provide a tube that will have additional cathodes as compared with tube V5.

Condenser 12 is chosen to be of large enough value so that it will not discharge for a period of five or six cycles. Condenser C12 will therefore keep the grid of V4b at a positive potential so that V4b will always be conducting as long as tube V5 steps to position 1 for each cycle. This condition would be indicative of the fact that the proper number of reflected pulses are returning to the control station and that all the receiving stations are functioning properly.

Should the equipment at any one station become inoperable, the return pulse from that station will not be applied to transformer T2 and therefore tube V5 will not step to position 1. Rather, if one station is unoperable, tube V5 will step only to position 3 for each cycle. As tube V5 repeatedly steps to position 3 rather than position 1, condenser C12 will eventually discharge, the grid of tube V4b will assume a potential of negative 24 volts, and tube V4b will cease to conduct. As the conduction in this tube ceases, the alarm relay will release and close its contacts, which in turn will energize an alarm circuit, not shown in the drawing. The operator, upon observing the alarm condition, may take whatever action he may deem necessary.

The description of Figs. 2 and 3 so far has described the operation of the system in its normal condition. The operator upon notification of an air raid alert condition will cause the circuit of Fig. 2 to transmit a distinctive alarm signal to all the receiving stations. Assuming that a condition red alert is to be sent to all the receiving stations, the operator would move switch S1 from resistor R25 to R26. This will cause the multivibrator to send out pulses of a different frequency, which for purposes of explanation may be assumed to be 20 cycles. After the 20 cycle pulses are amplified in each receiving station, they will pass through the 20 cycle band-pass filter and through the red key to the rectifier network associated with the red key. This will cause a D. C. voltage to be applied to relay A, which will now operate and light lamp R. Lamp R in lighting will warn the operator in each receiving station that a red alert condition exists. As soon as the operator at each receiving station observes the red lamp lit, he will operate the red key which will remove the pulses from the rectifier network and apply them to the telephone line returning to the control station.

If the operator at each receiving station performed his required duty upon receipt of the red alert condition, the proper number of reflected pulses will be applied to transformer T2 which will cause tube V5 to step to position 1 and tube V4b to conduct, thereby holding the alarm relay operated. Should the operator at any receiving station fail to operate the red key upon notification of the red alert condition, the proper number of pulses will not return to the control center, which will cause tube V5 to step to some position short of position 1 and thereby allow tube V4b to become cut-off and energize the alarm circuit. By observing the oscilloscope, the operator at the control center can ascertain which receiving station has not responded to the red alarm. By means so far described, the operator at the control station has both a visual and an audible check on the proper functioning of the entire system.

Should the operator at the control station desire to transmit a signal indicative of condition white, he would step switch S1 from resistor 26 to resistor 27. This would cause the multivibrator to send out a pulse train at a frequency of 30 cycles. The 30 cycle pulses in each receiving station will cause relay B to be operated by its associated rectifier network which, in turn will energize lamp W, thereby signifying a white air raid condition at each receiving station. Upon receipt of the white alarm, the operator at each station will operate the white key, which will cause the 30 cycle pulse train to be applied to the right hand contacts of relay P. Also, as the white key is operated, a circuit will be closed from the low frequency interrupter to the winding of relay P so that relay P will operate and release at a frequency determined by the interrupter. At the time relay P is operated, the 30 cycle pulses will be applied to the telephone line returning to the control station. At the time relay P is unoperated, the 30-cycle pulses will not be applied to the return telephone line.

The frequency of the interrupter circuit is arranged so that it will momentarily operate relay P once every four or five seconds. Since the return pulses from a particular station will not be sent to the control station while the P relay at said particular station is operated, the oscilloscope screen will show no indication of the particular station at the time its P relay is operated. Since the P relays in all the receiving stations will be operating concurrently but not in synchronism, the resultant pattern as observed on the oscilloscope screen will be a plurality of intermittent pulses with the pulse representing each receiving station reoccurring intermittently as determined by the frequency of the interrupter and the intermittent operation of relay P. Each time the P relay in any station operates, tube V5 will fail to step to position 1 since it will fail to receive the proper number of pulses. Condenser C12 is chosen to be of a value that will permit the charge on the grid of V4b to remain positive for a sufficient period of time so as to be unaffected by the momentary failure of the circuit to receive the proper number of pulses from the receiving stations. Therefore, the alarm circuit at the control station will not be operated if the proper number of pulses are not received for a short period of time, such as three or four seconds. As long as the tube V5 steps to position 1 within a reasonably short period of time, tube V4b will remain conducting and the alarm circuit will remain normal.

Should the operator at any one station fail to operate the white key upon reception of the white alarm, the 30 cycle pulse train at his station would not be applied to the return telephone line and the alarm in the control center will be actuated by the failure of tube V5 to step to position 1 as long as the white key in any receiving station remains unoperable.

If the operator at the control station should decide to send the yellow alarm, he would move switch S1 to position R28 which would cause the multivibrator to send out pulses at a frequency of 40 cycles. These 40 cycle pulses upon arriving at each receiving station will energize relay C and lamp Y. Lamp Y energized will indicate a yellow condition of alert to the operator. Upon the receipt of the yellow alert, the operator in each receiving station will operate the yellow key which will remove the 40 cycle pulses from the rectifier network and apply them to the left-hand contacts of relay P. A circuit is also closed at this time whereby the relay P will be operated intermittently by the interrupter circuit.

When relay P is unoperated, the 40 cycle pulses will be applied directly to the return telephone line and if the yellow key in every receiving station is operated, the proper number of return pulses for each pulse transmitted will be applied to the counting circuits in the control station. When relay P is operated, the 40 cycle pulse train is applied through a delay network to the return telephone line. The delay network possesses such characteristics that it will take a pulse going through it a slightly longer length of time to return to the control station than would a pulse take in going directly to the return telephone line and back to the control station.

This intermittent operation of relay P in each station will cause the oscilloscope in the control station to present a picture in which all the pulses returning will assume an intermittent horizontal shifting motion. This horizontal shifting of each return pulse will be caused by the incremental time it takes the return pulse to travel through the delay network and back to the control station as compared to the time it takes a pulse in going directly to the return telephone line and back to the control station. This varying time of return for each pulse will not affect tube V5 since it will step at whatever time each pulse returns and as long as the proper number of pulses return, the alarm circuit will be held inoperable.

When it is no longer desired to disseminate an alarm, the operator at the control center will move switch S1 back to its normal position which will cause the free-running multivibrator to resume normal operation at the frequency of 50 cycles per second.

It is to be understood that the above-described arrangements are but illustrative of the application of the principles of the invention. Numerous other arrangements may be devised by those skilled in the art without departing from the spirit and scope of the invention.

What is claimed is:

1. In a signalling system, a control center, a plurality of outlying receiving stations connected therewith by two pairs of conductors, each of said receiving stations being a different distance from said control center, means at said control center for transmitting signals of predetermined frequencies over one of said conductor pairs to all of said stations, signal indicating means at each station responsive to the reception thereat of said signals of selected predetermined frequencies, means at each station for applying said received signals to said other conductor pair for transmission to said control center whereby said received signals are received at said control center at different instances of time in accordance with the distance between the control center and each of said receiving stations, means at said control center responsive to said signals applied to said other conductor pair for confirming the reception of signals at all of said receiving stations, means operative at said control center in response to the reception of signals from less than all of said receiving stations to actuate an alarm.

2. In a signalling system, a control center, a plurality of receiving stations connected therewith by two pairs of conductors with each receiving station being a different distance from said control center, means at said control center for transmitting a pulse at predetermined intervals over one of said conductor pairs to all of said receiving stations, means at each station for applying each pulse received to said other conductor pair, both of said conductor pairs having inherent electrical delay characteristics so that the pulse applied to said other conductor pair by each station will arrive at said control center at different times as determined by the distance of each station from said control center, means at said control center responsive to the pulses received at varying times from said receiving stations for each pulse transmitted from said control center, and means to indicate an alarm should the number of pulses returning for each pulse transmitted ever be less than the number of receiving stations.

3. A system as defined in claim 2 in combination with means at said control center to vary the rate at which pulses are applied to said first-mentioned conductor pair, means at each receiving station responsive only to a selected frequency of pulses, means to indicate an alarm when the rate of pulses transmitted from said control center equals the responsive frequency of said last named means.

4. In a signaling system having a normal condition and a plurality of selective alarm conditions, a control center, a plurality of receiving stations all of which are connected with said control center by a plurality of transmission paths, each of said receiving stations being a different distance from said control center, means at said control center for transmitting signals representing a normal condition of said system over a first transmission path to all of said receiving stations during the normal condition of said system, means at each receiving station for retransmitting said received normal condition signals to said control center over a second transmission path whereby the retransmitted signals from the receiving stations are received by the control center at different instances of time in accordance with the distance between the control center and each receiving station, means at said control center for selectively transmitting one alarm signal out of a plurality of different alarm signals over said first transmission path to all of said receiving stations during an alarm condition at said control center, a plurality of alarm devices at each of said receiving stations with each one of said alarm devices being operatively associated with an individual one of said alarm signals that may be transmitted by said control center, means at each of said receiving stations to energize each one of said alarm devices upon the receipt of its related alarm signal thereat from said control center, a plurality of switching means at each receiving station with each of said switching means being operatively associated with an individual one of said alarm devices, means at each receiving station whereby the operation of a switching means deenergizes said alarm device and causes said currently received alarm signal to be retransmitted to said control center over said second transmission path whereby the retransmitted signals from the receiving stations are received by the control center at different instances of time in accordance with the distance between the control center and each receiving station, and means at said control center responsive both to said retransmitted normal condition signals and to said retransmitted alarm signal applied to said second transmission path to confirm the reception of said received signals at all of said receiving stations.

5. In a signaling system having a normal condition and a plurality of selective alarm conditions, a control center, a plurality of receiving stations all of which are connected with said control center by a plurality of transmission paths, each of said receiving stations being a different distance from said control center, means at said control center for transmitting signals representing a normal condition of said system over a first transmission path to all of said receiving stations during the normal condition of said system, means at each receiving station for retransmitting said received normal condition signals to said control center over a second transmission path whereby the retransmitted signals from the receiving stations are received by the control center at different instances of time depending upon the distance between the control center and each receiving station, means at said control center for selectively transmitting one alarm signal out of a plurality of alarm signals over said first transmission path to all of said receiving stations during an alarm condition at said control center, a plurality of alarm devices at each of said receiving stations with each one of said alarm devices being operatively associated with an individual one of the said alarm signals that may be transmitted by said control center, means at each of said receiving stations to energize each one of said alarm devices upon the receipt of its related alarm signal thereat from said control center, a plurality of switching means at each receiving station with each of said switching means being operatively associated with an individual one of said alarm devices, means at each receiving station whereby the operation of a switching means deenergizes said alarm device and cause said currently received alarm signal to be retransmitted to said control center over said second transmission path whereby the retransmitted signals from the receiving stations are received by the control center at different instances of time depending upon the distance between each receiving station and the control center, and means at said control center responsive both to said retransmitted normal condition signals and to said retransmitted alarm signal applied to said second transmission path to confirm the reception of said received alarm signals at all of said receiving stations, alarm means at said control center operable when all of said receiving stations do not retransmit said received signals over said second transmission path to said control center.

6. In a signaling system having a normal condition and a plurality of selective alarm conditions, a control center, a plurality of receiving stations all of which are connected with said control center by a plurality of transmission paths, each of said receiving stations being a different distance from said control center, means including a pulse generator at said control center for transmitting pulse signals at a predetermined repetition rate representing a normal condition of said system over a first transmission path to all of said receiving stations during the normal condition of said system, means at each receiving station for retransmitting said received normal condition pulse signals to said control center over a second transmission path whereby the retransmitted signals from the receiving stations are received by the control center at different instances of time depending upon the distance between the control center and each receiving station, means including said pulse generator at said control center for selectively transmitting different alarm condition pulse signals over said first transmission path to all of said receiving stations during an alarm condition at said control center, each of said different alarm signals comprising a series of pulses of a repetition rate individual to itself, a plurality of alarm devices including a plurality of band pass filters and a plurality of rectifier networks at each of said receiving stations with each one of said alarm devices having operatively associated therewith an individual one of said band pass filters and an individual one of said rectifier networks, each of said filters being designed to pass an individual one of said alarm signals that may be transmitted by said control center, means at each of said receiving stations to energize each one of said alarm devices upon receipt of its related alarm signal thereat as transmitted from said control center through the band pass filter and rectifier network associated with said alarm device, a plurality of switching means at each receiving station with each of said switching means being operatively associated with an individual one of said alarm devices, circuit means at each receiving station whereby the operation of a switching means deenergizes said alarm device and causes said currently received alarm signal to be retransmitted to said control center over said second transmission path whereby the retransmitted signals from the receiving stations are received by the control center at different instances of time depending upon the distance between each receiving station and the control center, and means at said control center responsive both to said retransmitted normal condition pulse signals and to said retransmitted alarm signal applied to said second transmission path to confirm the reception of said received signals at all of said receiving stations, alarm means at said control center operable when all of said receiving stations do not retransmit said signals over said second transmission path to said control center.

7. In a signaling system having a normal condition and a plurality of selective alarm conditions, a control center, a plurality of receiving stations all of which are connected with said control center by a plurality of transmission paths, each of said receiving stations being a different distance from said control center, means including a pulse generator at said control center for transmitting pulse signals at a predetermined repetition rate representing a normal condition of said system over a first transmission path to all of said receiving stations during the normal condition of said system, means at each receiving station for retransmitting said received normal condition pulse signals to said control center over a second transmission path whereby the retransmitted signals from the receiving stations are received by the control center at different instances of time depending upon the distance between the control center and each receiving station, means including said pulse generator at said control center for selectively transmitting different alarm condition pulse signals over said first transmission path to all of said receiving stations during an alarm condition at said control center, each of said different alarm signals comprising a series of pulses of a repetition rate individual to itself, a plurality of alarm devices including a plurality of band pass filters and a plurality of rectifier networks at each of said receiving stations with each one of said alarm devices having operatively associated therewith an individual one of said band pass filters and an individual one of said rectifier networks, each of said filters being designed to pass an individual one of said alarm signals that may be transmitted by said control center, means at each of said receiving stations to energize each one of said alarm devices upon receipt of its related alarm signal thereat as transmitted from said control center through the band pass filter and rectifier network associated with said alarm device, a plurality of switching means at each receiving station with each of said switching means being operatively associated with an individual one of said alarm devices, circuit means at each receiving station whereby the operation of a switching means deenergizes its related alarm device and causes said currently received alarm signal to be retransmitted to said control center over said second transmission path whereby the retransmitted alarm signals from the receiving stations are received by the control center at different instances of time depending upon the distance between the control center and each receiving station, and means at said control center responsive both to said retransmitted normal condition pulse signals and to said retransmitted alarm signal applied to said second transmission path to confirm the reception of said received signals at all of said receiving stations, a pulse counting circuit at said control center operable by the receipt at said control center of the retransmitted received pulse from each receiving station so that said pulse counting circuit normally advances to a count equal to the number of receiving stations for every pulse transmitted from said control center, alarm means at said control center operable when said pulse counting circuit fails to advance to its normal count for a predetermined length of time, said alarm being indicative of the fact that all of said receiving stations are not retransmitting said received signals over said second transmission path to said control center.

References Cited in the file of this patent

UNITED STATES PATENTS

| | | |
|---|---|---|
| 2,315,435 | Leibe | Mar. 30, 1943 |
| 2,471,530 | Lobel | May 31, 1949 |
| 2,541,558 | Taylor | Feb. 13, 1951 |
| 2,545,894 | Parker | Mar. 20, 1951 |
| 2,574,458 | Atkinson | Nov. 13, 1951 |
| 2,577,141 | Mauchly | Dec. 4, 1951 |
| 2,581,056 | Walmsley | Jan. 1, 1952 |
| 2,602,853 | Harrison | July 8, 1952 |
| 2,623,208 | Wallace | Dec. 23, 1952 |
| 2,695,399 | Martin | Nov. 23, 1954 |